US007256779B2

(12) United States Patent
Donnelly

(10) Patent No.: US 7,256,779 B2
(45) Date of Patent: Aug. 14, 2007

(54) VIDEO GAME PLAY USING PANORAMICALLY-COMPOSITED DEPTH-MAPPED CUBE MAPPING

(75) Inventor: Paul Donnelly, Bellevue, WA (US)

(73) Assignee: Nintendo Co., Ltd., Kyoto (JP)

( * ) Notice: Subject to any disclaimer, the term of this patent is extended or adjusted under 35 U.S.C. 154(b) by 372 days.

(21) Appl. No.: 10/636,978

(22) Filed: Aug. 8, 2003

(65) Prior Publication Data

US 2004/0222988 A1 Nov. 11, 2004

Related U.S. Application Data

(60) Provisional application No. 60/468,645, filed on May 8, 2003.

(51) Int. Cl.
*G06T 15/40* (2006.01)
(52) U.S. Cl. .................................... 345/421
(58) Field of Classification Search ................ 345/621, 345/625; 463/33
See application file for complete search history.

(56) References Cited

U.S. PATENT DOCUMENTS

| | | | |
|---|---|---|---|
| 5,113,357 A | | 5/1992 | Johnson et al. |
| 5,396,583 A | * | 3/1995 | Chen et al. .................. 345/427 |
| 5,444,835 A | * | 8/1995 | Turkowski .................. 345/592 |
| 5,778,092 A | * | 7/1998 | MacLeod et al. ........... 382/176 |
| 5,831,620 A | | 11/1998 | Kichury, Jr. |
| 5,912,670 A | * | 6/1999 | Lipscomb et al. ........... 345/419 |
| 6,028,584 A | * | 2/2000 | Chiang et al. .............. 345/628 |
| 6,031,541 A | * | 2/2000 | Lipscomb et al. ........... 345/420 |
| 6,034,691 A | | 3/2000 | Aono et al. |
| 6,215,496 B1 | * | 4/2001 | Szeliski et al. ............. 345/419 |
| 6,331,856 B1 | | 12/2001 | Van Hook et al. |
| 6,411,301 B1 | | 6/2002 | Parikh et al. |
| 6,421,058 B2 | | 7/2002 | Parikh et al. |
| 6,424,348 B2 | | 7/2002 | Parikh et al. |
| 6,452,600 B1 | | 9/2002 | Parikh et al. |
| 6,456,290 B2 | | 9/2002 | Parikh et al. |
| 6,466,218 B2 | | 10/2002 | Parikh et al. |
| 6,477,536 B1 | | 11/2002 | Pasumansky et al. |
| 6,489,963 B2 | | 12/2002 | Parikh et al. |
| 6,509,902 B1 | | 1/2003 | Pfister et al. |
| 6,664,958 B1 | * | 12/2003 | Leather et al. ............. 345/422 |
| 6,724,385 B2 | * | 4/2004 | Takatsuka et al. .......... 345/427 |
| 6,876,362 B1 | * | 4/2005 | Newhall et al. ............ 345/426 |
| 6,894,689 B1 | * | 5/2005 | Greene et al. ............. 345/422 |
| 7,106,326 B2 | * | 9/2006 | Deering et al. ............. 345/426 |
| 2001/0056574 A1 | * | 12/2001 | Richards ...................... 725/36 |

OTHER PUBLICATIONS

Sutherland, Sproull, & Schumacker (1974). A Characterization of Ten Hidden-Surface Algorithms. Computing Surveys 6(1), Mar. 1974, p. 1-55.*

(Continued)

*Primary Examiner*—Ulka J. Chauhan
*Assistant Examiner*—Peter-Anthony Pappas
(74) *Attorney, Agent, or Firm*—Nixon & Vanderhye P.C.

(57) ABSTRACT

Video game play rendered using a panoramic view of a cube map style rendering uses an associated depth map to supply three-dimensionality to the pre-rendered scene. The resulting panoramic rendering may be indistinguishable from rendering the original scene in real-time except that the background is of pre-rendered quality.

22 Claims, 14 Drawing Sheets

OTHER PUBLICATIONS

Andrew Woo, Pierre Poulin, & Alain Fournier (1990). A survey of shadow algorithms. IEEE Computer Graphics & Applications, Nov. 1990, p. 13-32.*

D. Aliaga, J. Cohen, A. Wilson, H. Zhang, Erikson, Hoff, Hudson, Stuerzlinger, Baker, Bastos, Whiton, Brooks, & Manocha (1998). A framework for the real-time walkthrough of massive models. UNC at Chapel Hill Tech Report TR98-013.*

James Foley, Andries van Dam, Steven Feiner, John Hughes (1996). Computer Graphics: Principles and practice. Second edition in C. Addison-Wesley.*

Matthias Wloka & Brian Anderson (1995). Resolving occlusion in augmented reality. In 1995 Sympsoium on Interactive 3D Graphics, Monterey CA, ACM.*

Edwin Tripp (1976). A real-time three-dimensional color animation system. Dec. 1976 ACM SIGGRAPH 9(4).*

Jonathan Shade et al. (1998). Layered depth images. In Computer Graphics Proceedings, Annual conference series, p. 231-242.*

ABCs of Graphics Cards. Matrox. 1998. http://www.matrox.com/mga/theguide/contents/.*

OpenGL Cube Map Texturing (Nvidia 1999).

Kautz, "Towards Interactive Bump Mapping with Anisotropic Shift-Variant BRDFs" (ACM 2000).

Ward et al, "The Holodeck Ray Cache: An Interactive Rendering System for Global Illumination in Nondiffuse Environments", ACM Transactions on Graphics (1999).

ARB_Texture_Cube_Map (OpenGL Architectural Review Board 1999).

Assarsson et al, "An Optimized Soft Shadow Volume Algorithm With Real-Time Performance", Eurographics (2003).

Sweeney et al, "Shear Warp Deluxe: The Shear-Warp Algorithm Revisited" (Dept. of Computer Science, SUNY Stonybrook (2000).

Voorhies et al, "Reflection Vector Shading Hardware" SGI (1993).

Mantler et al, "Fast Approximate Visible Set Determination For Point Sample Clouds", Eurographics (2003).

Hakura et al, "Parameterized Environment Maps" ACM (2001).

Sloan et al, "Precomputed Radiance Transfer For Real-Time Rendering in Dynamic, Low-Frequency Lighting Environments" (ACM 2002).

McAllister et al, "Efficient Rendering of Spatial Bi-directional Reflectance Distribution Functions", Eurographics (2002).

Valliance et al, "Inward Looking Projections", ACM (2003).

Kilgard, Mark, J., SIGGRAPH Slide Presentation, "Lighting and Shading Techniques for Interactive Applications" 77 pages (1999).

White Paper: DirectX 7: What's New for Graphics, 9 pages (1999).

White Paper: Cube Environment Mapping, 8 pages, last update Jan. 14, 2000 (1999).

Szeliski, Richard et al., "Creating Full View Panoramic Image Mosaics and Environment Maps," Computer Graphics Proceedings, Annual Conference Series 1997, Aug. 3-8, 1997, pp. 251-258.

* cited by examiner

Fig. 5A
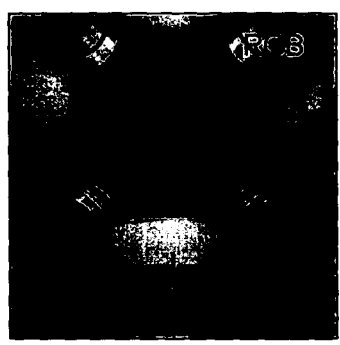
+
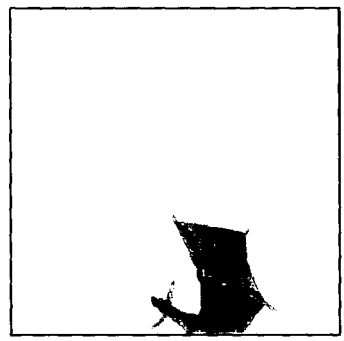
Fig. 5C
=
Fig. 5D
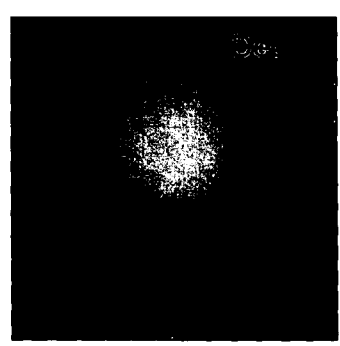
Fig. 5B
Fig. 5E

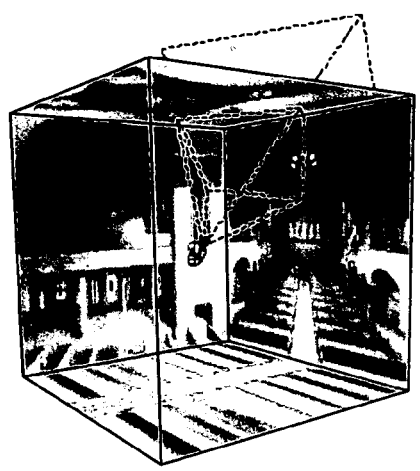  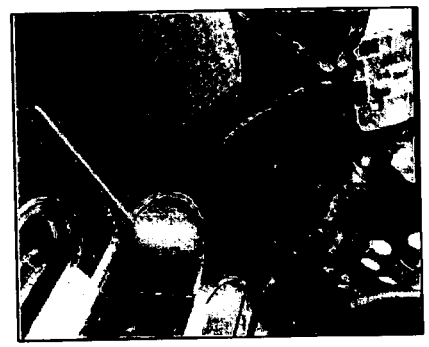
Fig. 6A　　　　　　　　　　Fig. 6B

VIDEO GAME PLAY USING PANORAMICALLY-COMPOSITED DEPTH-MAPPED CUBE MAPPING

CROSS-REFERENCES TO RELATED APPLICATIONS

Priority is claimed from application No. 60/468,645 filed May 8, 2003, which is incorporated herein by reference.

FIELD

The technology herein relates to video game play, and more particularly to efficient 3D video game rendering techniques using pre-rendered cube or other environment maps.

BACKGROUND AND SUMMARY

Modern home video games are more exciting and realistic than ever before. Relatively inexpensive 3D home video game platforms contain as much processing power as advanced computer graphics workstations of yesteryear. They can dynamically, interactively produce rich, realistic interesting displays of characters and other objects moving about in and interacting with a simulated three-dimensional world. From your living room on a home color television set, you can now fly virtual fighter planes and spacecraft through simulated battles, drive virtual race cars over simulated race tracks, ride virtual snowboards over simulated snow fields and ski slopes, race simulated jet skis over simulated water surfaces, and journey through exciting virtual worlds encountering all sorts of virtual characters and situations—just to name a few examples—all with highly realistic and exciting 3D images.

While home video game systems are now relatively powerful, even the most advanced home video game system lacks the processing resources that video game designers dream about. Home video game systems, after all, must be affordable yet have the extremely demanding task of producing high quality images dynamically and very rapidly (e.g., thirty or sixty frames per second). They must respond in real-time to user controls—reacting essentially instantaneously from the standpoint of the user. At the same time, video game developers and their audiences continually desire ever richer, more complex, more realistic images. More complicated and detailed images place exceedingly high demands on relatively inexpensive video game system processors and other internal circuitry. If the image is too complicated, the video game platform will not be able to render it in the time available. This can sometimes result in incomplete, only partially rendered images that may appear flawed and unrealistic and thus disappoint users.

One approach to help solve this problem involves pre-rendering complicated scenes in advance and then adapting or otherwise manipulating those scenes in real-time to provide interactive video game play. For example, it is possible for a video game designer at the time he or she creates a video game to use a very powerful computer to pre-calculate and pre-render background scenery and other images. Developing a new video game can sometimes take a year or more, so using a high-power computer graphics workstation or even a supercomputer for hours at a time to render individual complicated background images is feasible. Such interesting and complicated background images are then often essentially "pasted" onto 3D surfaces through use of texture mapping during real-time video game play. This technique can be used to provide rich and interesting background and other video game play elements without a corresponding substantial increase in real-time processing overhead.

While such pre-rendered texture maps have been used with substantial advantageous results in the past, they have some shortcomings in interactive video game play. For example, texture-mapping a pre-rendered image onto a 3D surface during interactive video game play can successfully create impressive visual complexity but may let down the user who wants his or her video game character or other moving object to interact with that complexity. The tremendous advantageous 3D video games have over 2D video games is the ability of moving objects to interact in three dimensions with other elements in the scene. Pre-rendered textures, in contrast, are essentially 2D images that are warped or wrapped onto 3D surfaces but still remain two-dimensional. One analogy that is apt for at least some applications is to think of a texture as being like a complex photograph pasted onto a billboard. From a distance, the photograph can look extremely realistic. However, if you walk up and touch the billboard you will immediately find out that the image is only two dimensional and cannot be interacted with in three dimensions.

We have discovered a unique way to solve this problem in the context of real-time interactive video game play. Just as Alice was able to travel into a 3D world behind her mirror in the story "Alice Through the Looking Glass", we have developed a video game play technique that allows rich pre-rendered images to create 3D worlds with depth.

In one embodiment, we use a known technique called cube mapping to pre-render images defining a 3D scene. Cube mapping is a form of environment mapping that has been used in the past to provide realistic reflection mapping independent of viewpoint. For example, one common usage of environment mapping is to add realistic reflections to a 3D-rendered scene. Imagine a mirror hanging on the wall. The mirror reflects the scene in the room. As the viewer moves about the room, his or her viewpoint changes so that different objects in the room become visible in the mirror. Cube mapping has been used in the past or provide these and other reflection effects.

We use cube mapping for a somewhat different purpose—to pre-render a three-dimensional scene or universe such as for example a landscape, the interior of a great cathedral, a castle, or any other desired realistic or fantastic scene. We then add depth to the pre-rendered scene by creating and supplying a depth buffer for each cube-mapped image. The depth buffer defines depths of different objects depicted in the cube map. Using the depth buffer in combination with the cube map allows moving objects to interact with the cube-mapped image in complex, three-dimensional ways. For example, depending upon the effect desired, moving objects can obstruct or be obstructed by some but not other elements depicted in the cube map and/or collide with such elements. The resulting depth information supplied to a panoramically-composited cube map provides a complex interactive visual scene with a degree of 3D realism and interactivity not previously available in conventional strictly 2D texture mapped games.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 5A-5E show exemplary cube-map and real-time character compositing process examples;

FIGS. 6A and 6B show exemplary illustrative final rendering examples; and

DETAILED DESCRIPTION

Figure 1:
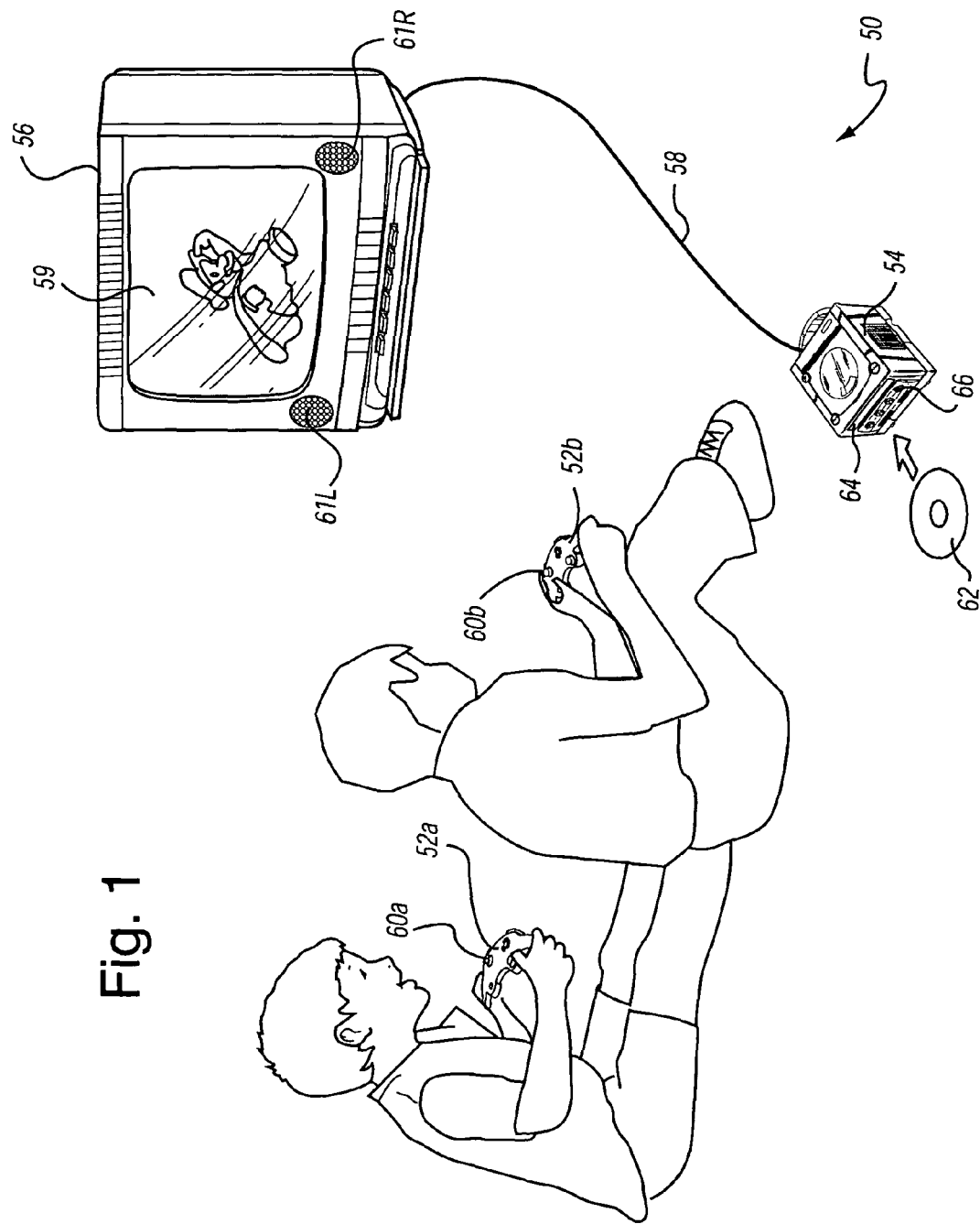
FIGS. 1 and 2 show an exemplary non-limiting video game playing system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real-time, a digital representation or model of a three-dimensional world. System 50 can display some or all of the world from any arbitrary viewpoint. For example, system 50 can interactively change the viewpoint in response to real-time inputs from handheld controllers 52a, 52b or other input devices. This allows the game player to see the world through the eyes of someone within or outside of the world. System 50 can be used for applications that do not require real-time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 in this example produces both video signals and audio signals for controlling color television set 56. The video signals are what controls the images displayed on the television screen 59, and the audio signals are played back as sound through television stereo loudspeakers 61L, 61R.

The user also connects main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Non-Limiting Electronics and Architecture of Overall System

Figure 2:
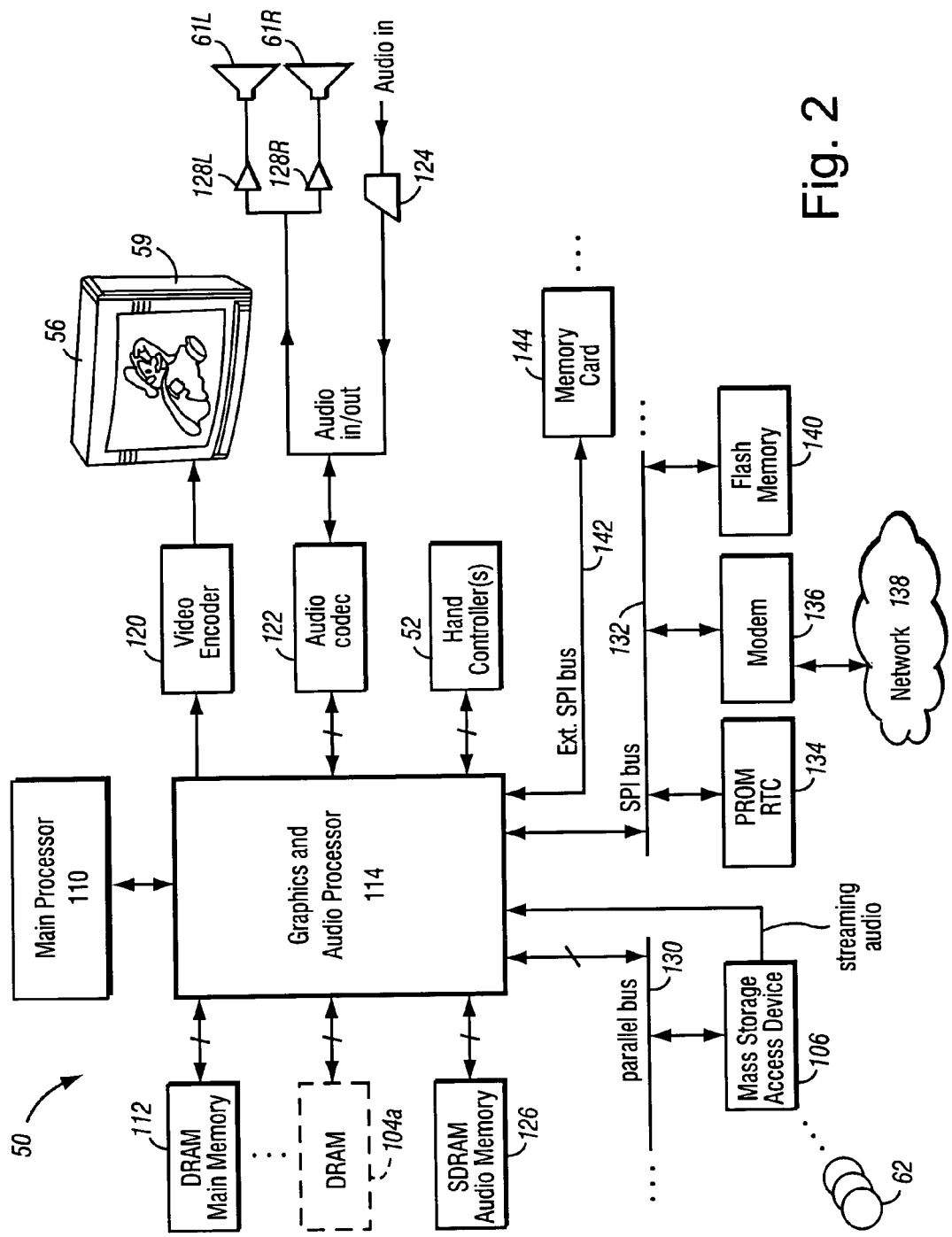

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750 or other microprocessor) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real-time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Exemplary Non-Limiting Video Game Panoramic Compositing Technique

Figure 3A:
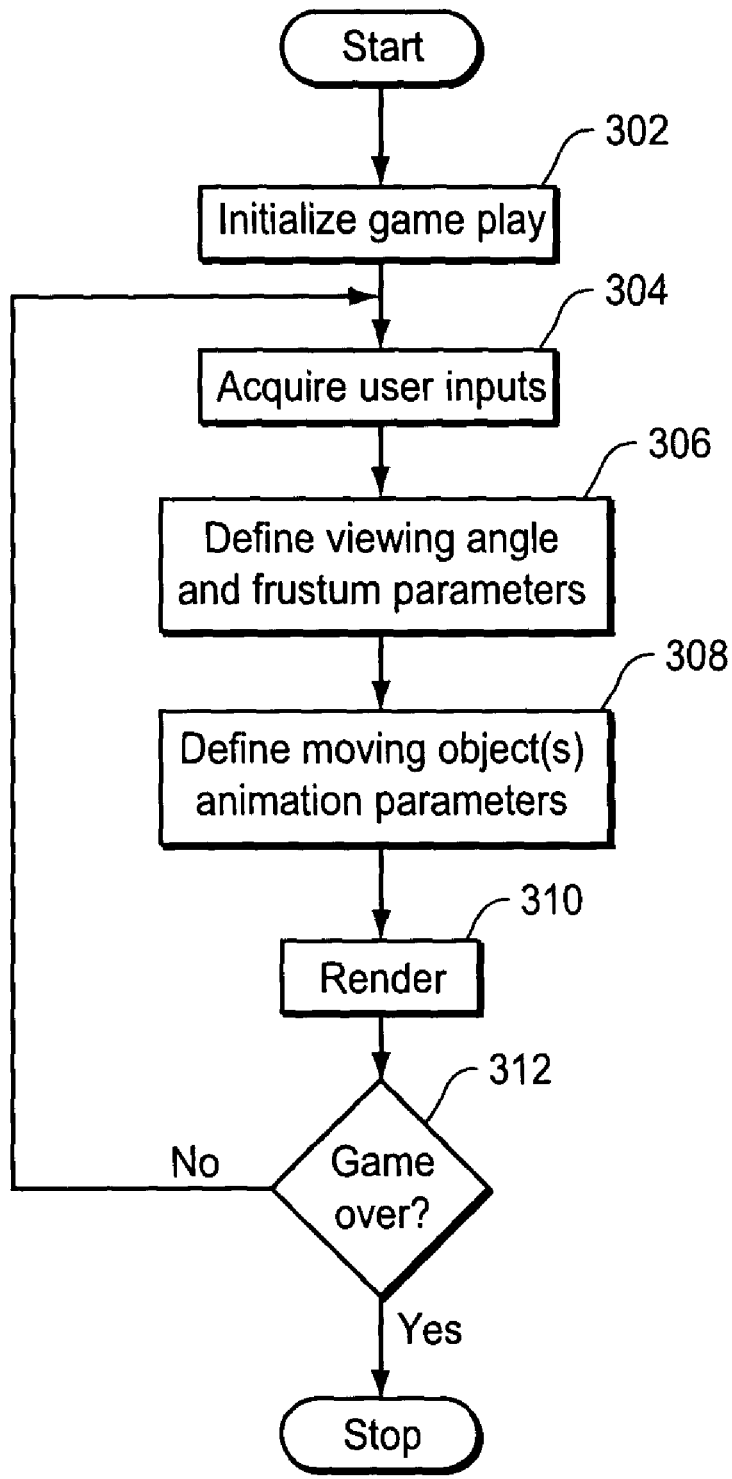
FIGS. 3A and 3B show exemplary flowcharts of non-limiting illustrative video game processes.

FIG. 3A shows an example flowchart of illustrative non-limiting video game play on the system shown in FIGS. 1 and 2. The software used to control and define the operations shown in FIG. 3A may be stored in whole or in part on mass storage device 62 which is loaded into or otherwise coupled to video game system 50 before game play begins. In another example, the software may be downloaded over network 138 and loaded into internal memory of the video game system 50 for execution.

To play an exemplary illustrative video game, the user may depress a "start" or other control which causes the execution of program instructions to initialize game play (FIG. 3A, block 302). Once the game has begun executing, the system 50 may acquire user inputs from handheld controllers 52 or other input sources (FIG. 3A, block 304) and define corresponding viewing angle and frustum parameters corresponding to one or more virtual camera or other views (FIG. 3A, block 306). The software may also define one or more moving objects such as moving characters and associated animation parameters (FIG. 3A, block 308). The game may then render a frame onto display 56 (FIG. 3A, block 310). Assuming the game is not over ("no" exit to decision block 312), blocks 304-310 are repeated rapidly (e.g., thirty or sixty times each second) to provide interactive video game play.

Figure 3B:
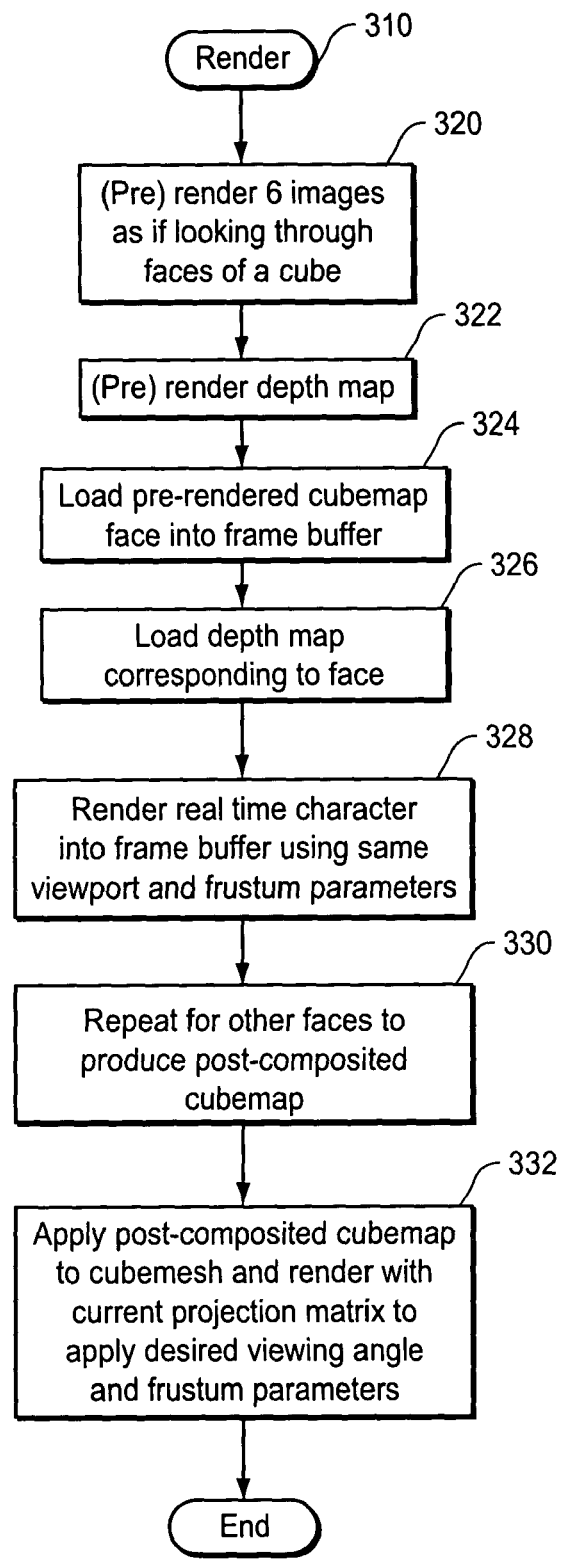

FIG. 3B shows an example "render" routine used by the FIG. 3A video game software to provide panoramic compositing allowing rich, complex 3D virtual scenes and worlds. In the exemplary illustrative embodiment, the first two blocks 320, 322 of FIG. 3B are performed in advance ("pre-rendered") before real-time rendering, and the remaining blocks 324-332 are performed during real-time rendering. The pre-rendering blocks 320, 322 in one exemplary illustrative embodiment are not performed by video game system 50 at all, but rather are performed well in advance by another computer or graphics workstation that may for example use complicated, time-consuming non-real-time 3D rendering techniques such as ray tracing. In other exemplary embodiments, blocks 320, 322 can be performed as part of the "initialized game play" block 302 shown in FIG. 3A. In still other embodiments, if real-time processing resources are available, blocks 320, 322 can be performed by system 50 at the beginning of a game play sequence or the like.

Figures 4A, 4B, 4C:
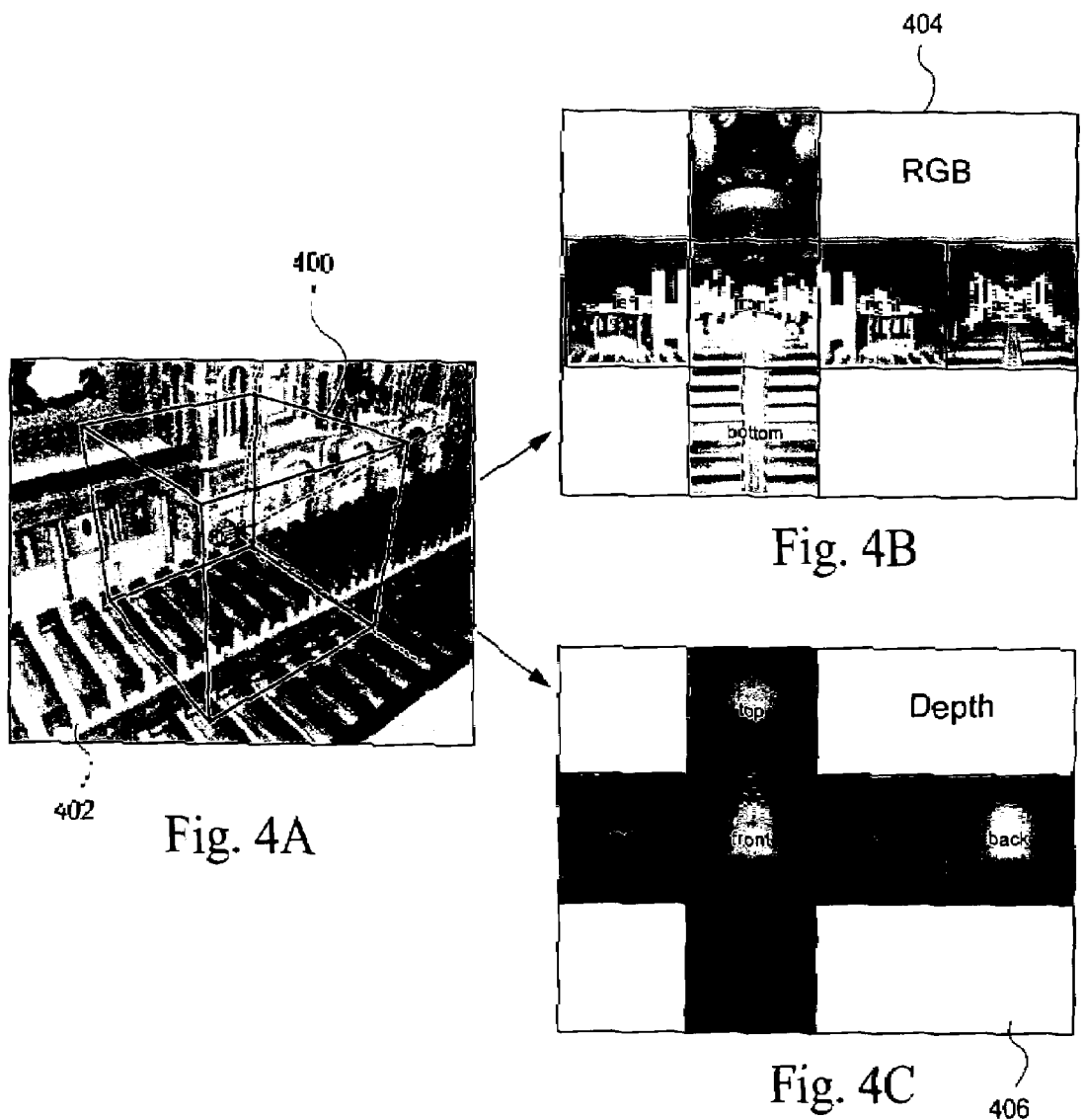
FIGS. 4A-4C show exemplary illustrative pre-rendering examples.

To perform the pre-render exemplary process, a virtual cube 400 is defined within a virtual three-dimensional universe. As shown in illustrative FIG. 4A, virtual cube 400 may be defined within any realistic or fantastic scene such as, for example, the interior of a medieval cathedral. The cube 400 is used for cube mapping. A panoramic view is created using a cube map style rendering of the scene from a chosen location as shown in FIG. 4A to provide more camera freedom for pre-rendered games. This technique in one exemplary illustration keeps the viewpoint static but allows the player to look around in any direction.

In more detail, an exemplary 3D scene 402 is created using any conventional 3D modeling application. The scene is rendered out in six different images as if looking through the six different faces of cube 400 with the viewpoint at the center of the cube (FIG. 3B, block 320). This produces a high-quality off-line rendered RGB or other color cube map 404 representation of the scene as shown in FIG. 4B. In exemplary illustrative embodiment, a depth map 406 of the same scene is also created based on the same six cube image faces (see FIG. 4C and block 322 of FIG. 3B).

During real-time video game play (FIG. 3B, block 324), video game system 50 loads the pre-rendered cube map face into its embedded frame buffer memory and loads the pre-rendered depth map corresponding to that face into a memory such as a Z (depth) buffer (FIG. 3B, blocks 324, 326). In one exemplary embodiment, the cube map 404 and depth map 406 such as shown in FIGS. 4B, 4C may be stored on mass storage device 62 or it may be downloaded over network 138.

Once these data structures are in appropriate memory of video game system 50, the video game software renders one or more real-time objects such as animated characters into the frame buffer using the same view point and frustum parameters in one exemplary embodiment to provide a composite image (FIG. 3B, block 328). Such rendering may make use of the depth information 406 (e.g., through use of a conventional hardware or software-based Z-compare operation and/or collision detection) to provide hidden surface removal and other effects.

This same process is repeated in the exemplary embodiment for each of the other cube-mapped faces to produce a post-composited cube map (FIG. 3B, block 330). As will be appreciated by those of ordinary skill in the art, in at least some applications it is possible to reduce the number of cube mapped faces to composite by performing a rough "bounding box" or other type test determining which cube mapped faces (e.g., one, two, three or a maximum) the moving object image is to be displayed within, thereby avoiding the need to composite these unaffected faces. There are cases where a character could span more than three faces of the cube. (And if the final frustum is wide enough we could see more than three faces at once also.) It is the intersection between three things which is rendered in real-time and composited with the cube map in the exemplary embodiment:

the final frustum;

the moving/animating character (which may be approximated using bounding boxes, convex hull, or other method);

the cube map faces, or predefined portions thereof (in one example implementation we split each cube face into four pieces, thus reducing the amount of area that needed to be composited).

Once a complete post-composited cube map has been created, it is then applied to a cube or other mesh and rendered with the current projection matrix to create a panoramic image with desired viewing angle and frustum parameters (FIG. 3B, block 332). See FIGS. 6A and 6B. In one exemplary illustrative non-limiting embodiment, this final rendering step simply applies the multiple cube map faces on the inside of a cube mesh and proceeds by panoramically rendering in a conventional fashion with a normal projection matrix using conventional hardware and/or software rendering techniques and engines. The result should be indistinguishable from rendering the original scene in real-time in the first place except that the background is at pre-rendered quality.

Panoramic Compositing—Example Implementation Details
  Example Art Path for Panoramic Compositing:
  1. Pre-render the RGB and Depth buffers 404, 406 for each cube face from a CG tool such as Maya or other standard tool.
  2. Possible to use a resolution of for example 1024×1024 for each field of view ("FOV") 90 degree cube face. If we consider the case where the viewing direction is towards the center of a face, we get a 1:1 texel to pixel ratio with an NTSC 640×480 screen with a horizontal FOV of 38.7°, and vertical FOV of 28°. When we face the edges or corners of the cube, the texel to pixel ratio increases (maximum 1.73 times more at the corners).
  3. In an example embodiment, due to frame-buffer size limitations, or for efficiency reasons it may be useful to perform the compositing in pieces less than the full size of a cube face, and copy these intermediate results to texture maps for final rendering in a separate pass. For example, each face of the original cube could be split into four pieces of 512×512 each. Other techniques could be used in other embodiments.
  4. Regarding the format of the Z-textures: One example implementation uses 16-bit Z textures. The value which must be stored in the Z texture is not actually Z, but can be:

$$\frac{far(Z - near)}{Z(far - near)}$$

5. Another detail is worth mentioning regarding pre-rendered Z (depth) buffers 406. With pre-rendered RGB buffers 404, we have the luxury of doing a fully super-sampled rendering to give smooth edges, and correct filtering. However, with Z we may have less resolution (e.g., only one sample per pixel in some cases). When we try to composite our real-time graphics with the pre-rendered graphics, this can cause artifacts. The worst of these artifacts is when the Z value says a pixel is foreground, but the RGB average is closer to the background color. Then when a character is between the foreground and the background, we may get a halo of background color around foreground objects. In order to minimize this effect, we have found it is better to bias towards using the background Z value as the representative Z value for pixels whose RGB is a mixture of foreground and background colors. To achieve this kind of control over the source textures, one can render at a higher resolution initially and pre-process the data down to the final size.

This technique may be useful for another reason as well. For example, some conventional offline renderers may use jittered sampling, and thus the outlines of straight edged objects can sometimes become ragged unless rendered at a higher resolution initially and further processed to get a cleaner Z image. Other example embodiments may not be concerned with this issue.

6. Optimization. There is no need to composite all panels or cube face images in the pre-pass. Only those which overlap both the final frustum and the real-time characters need to be composited and copied out.

Example Images

Figure 7A:
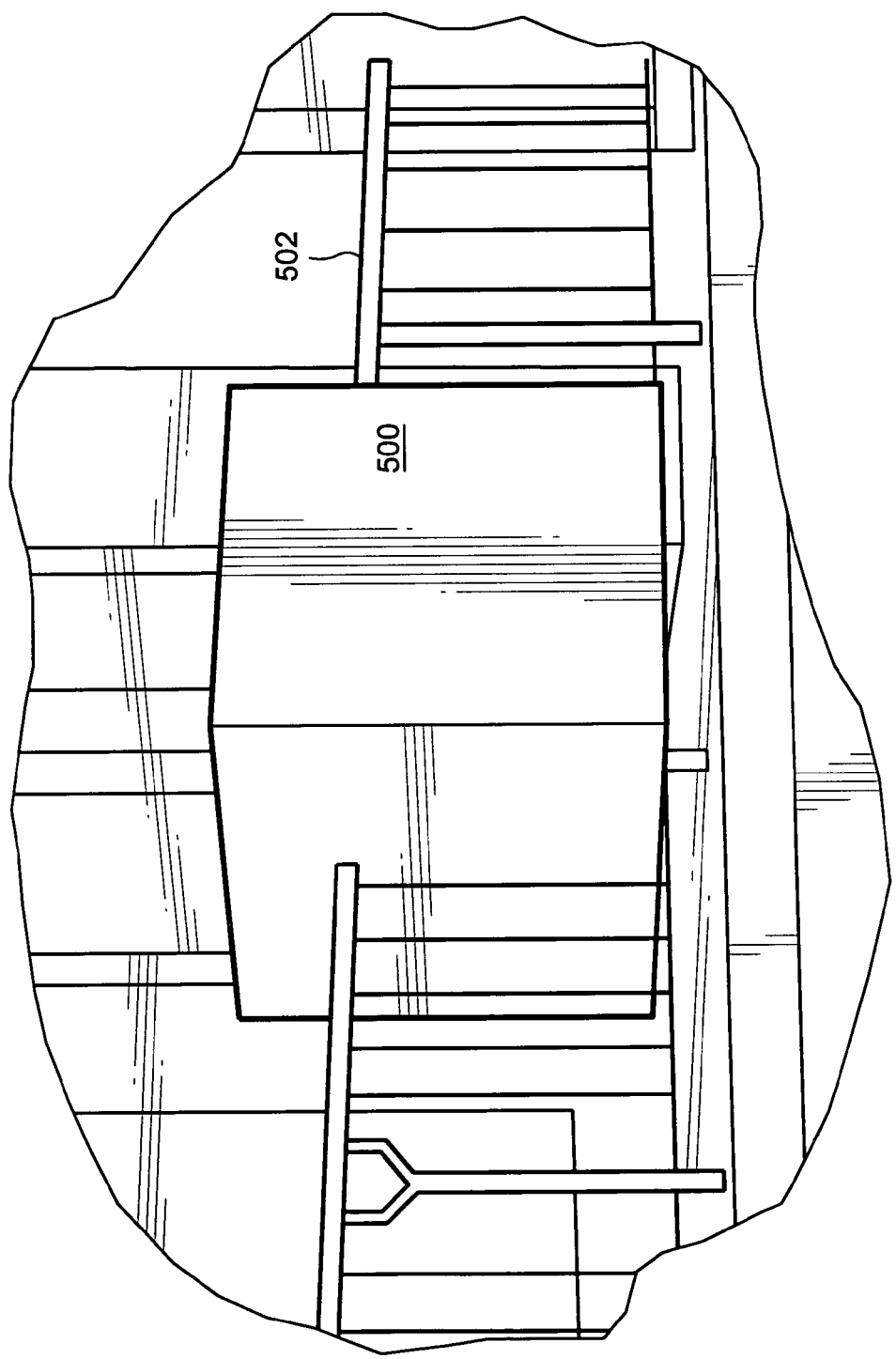
FIGS. 7A-7G show example interactivity between a 3D object and an exemplary 3D scene defined by a illustrative depth-mapped panoramically-composited cube map.
Figure 7B:
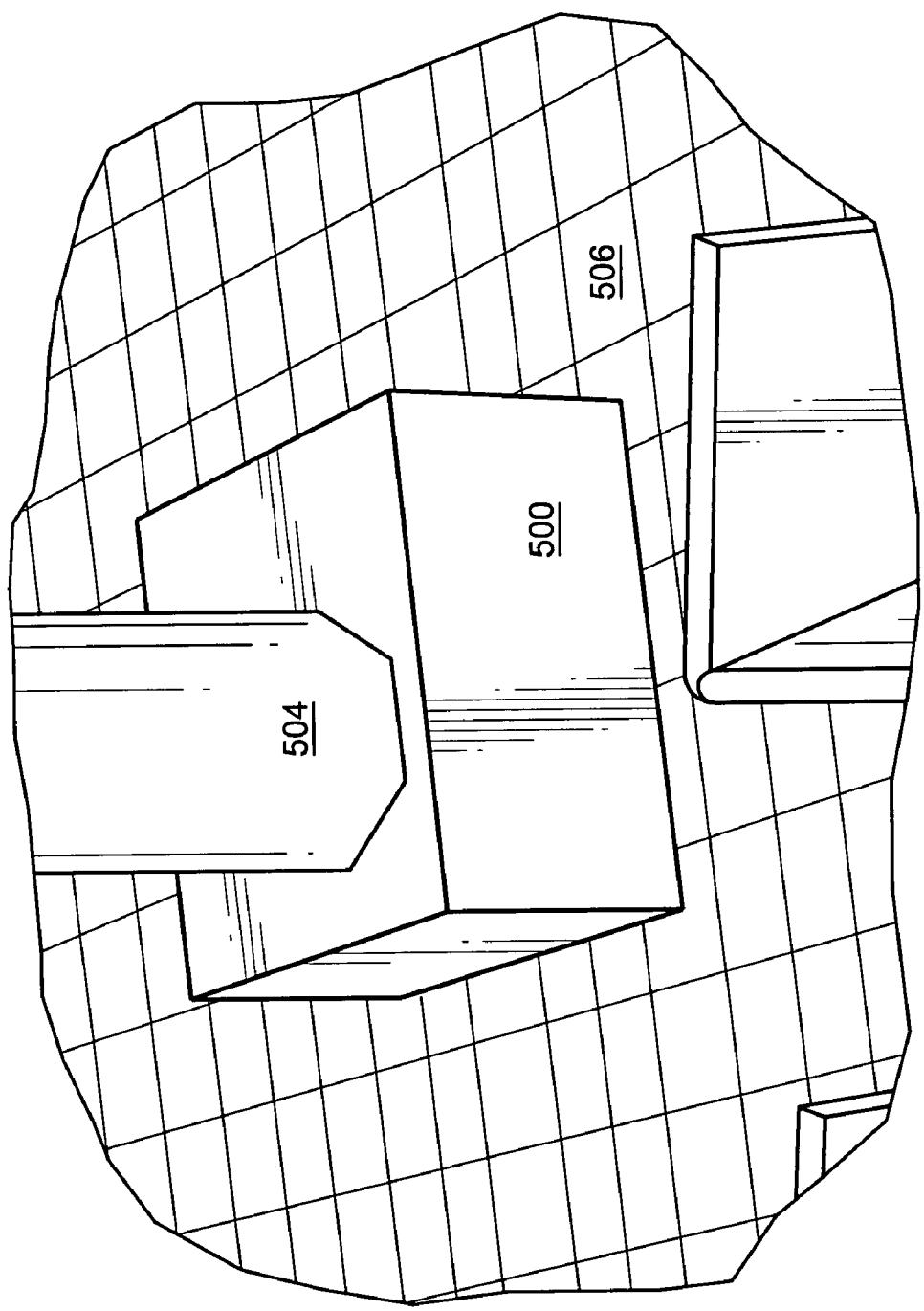
Figure 7C:
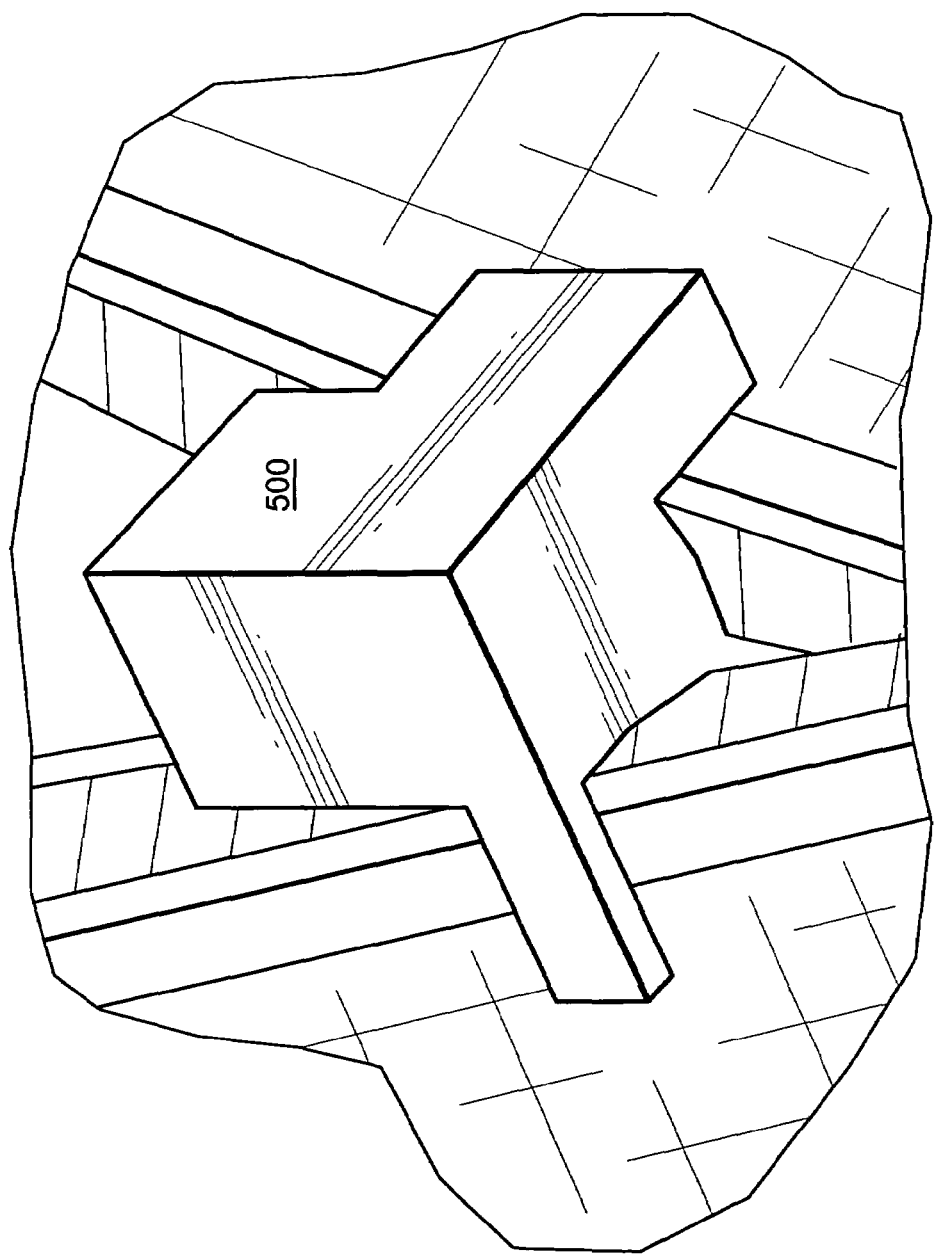
Figure 7D:
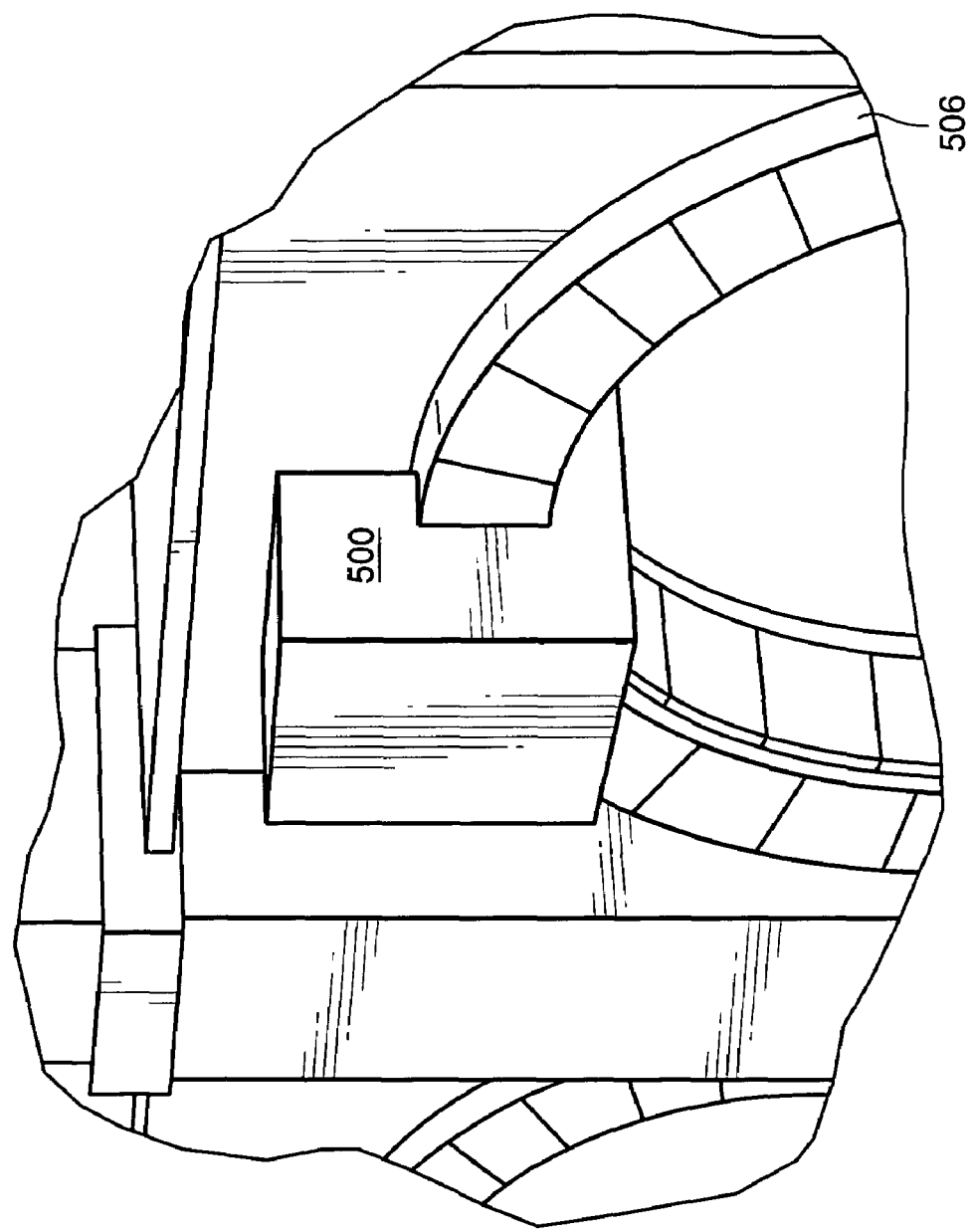
Figure 7E:
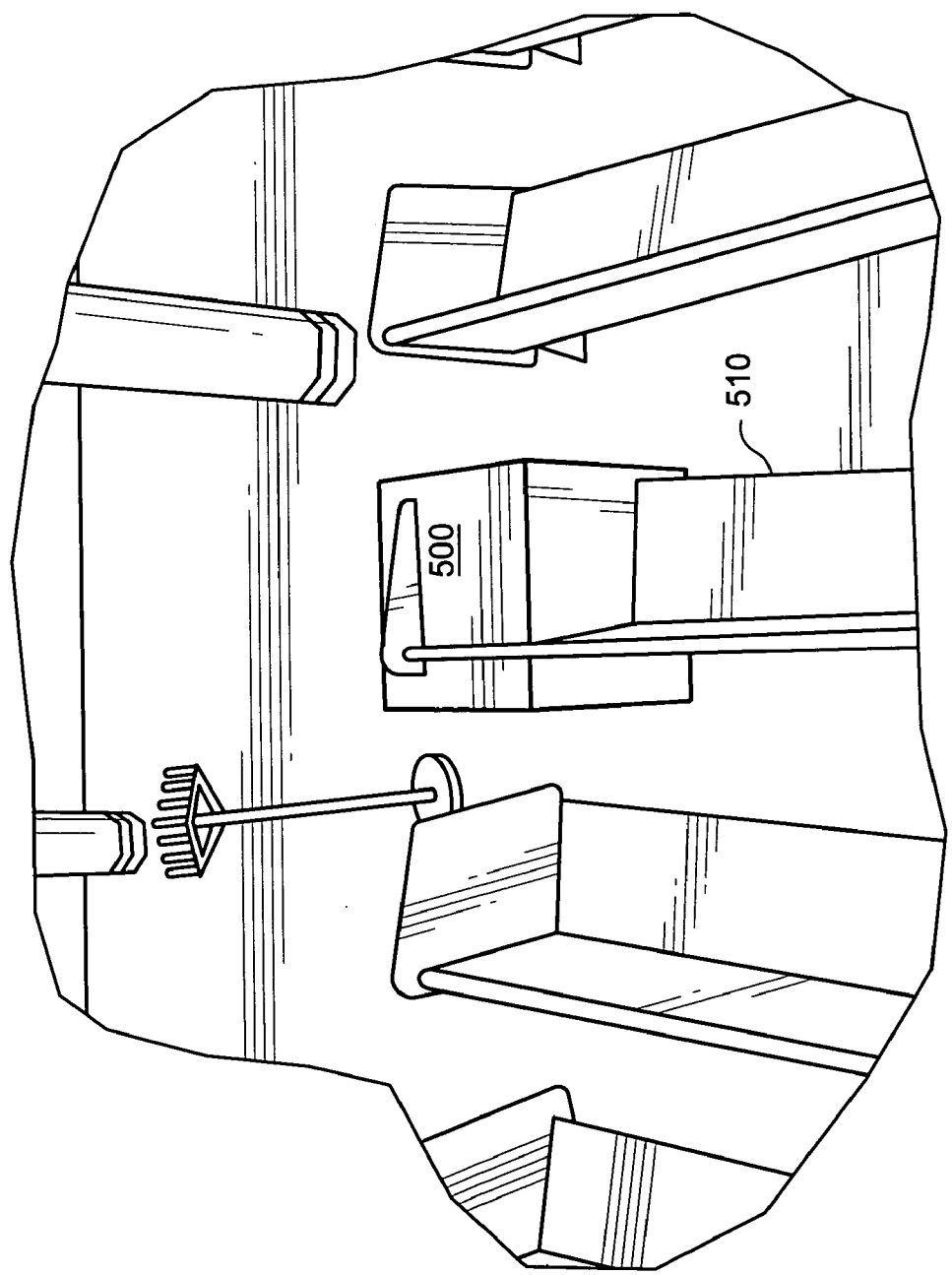
Figure 7F:
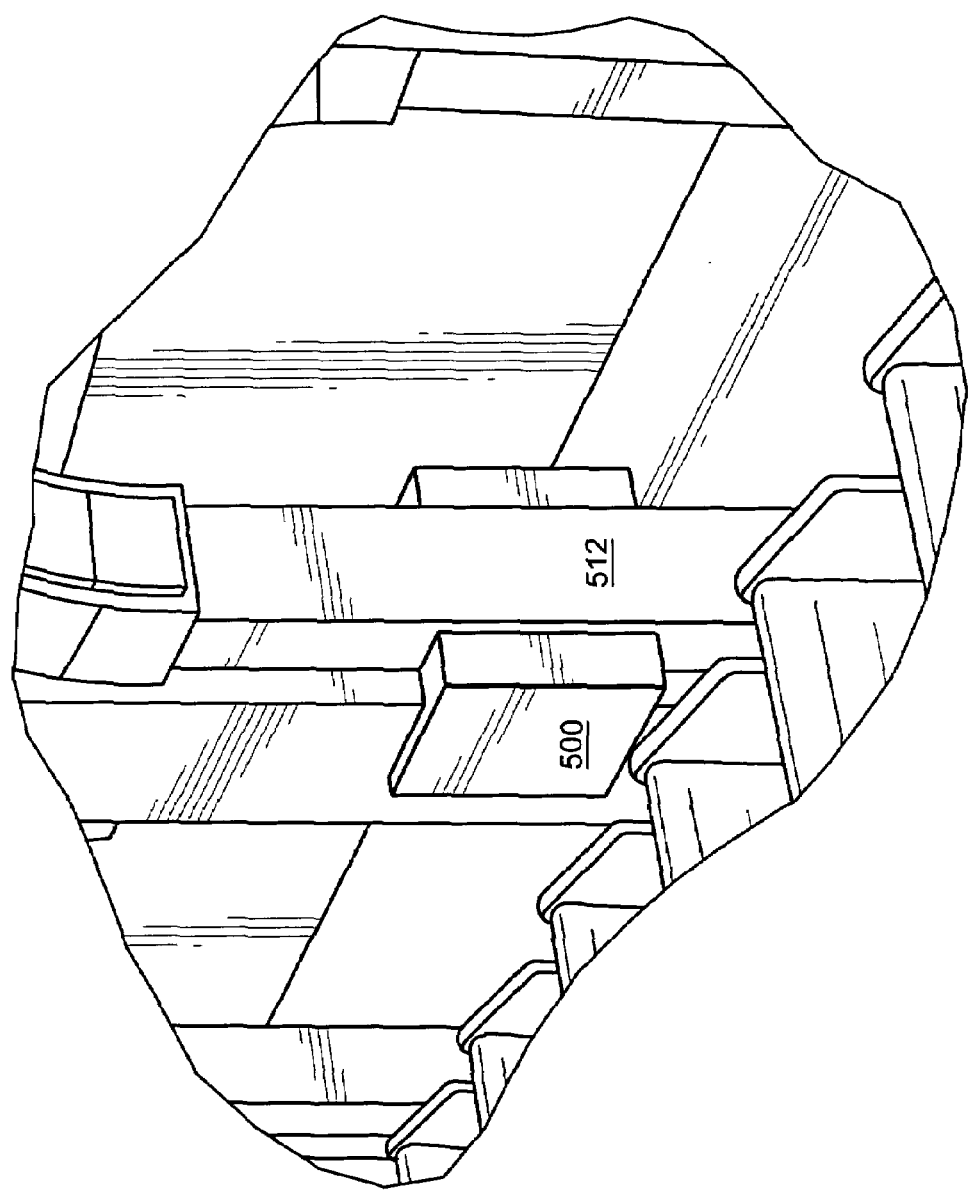
Figure 7G:
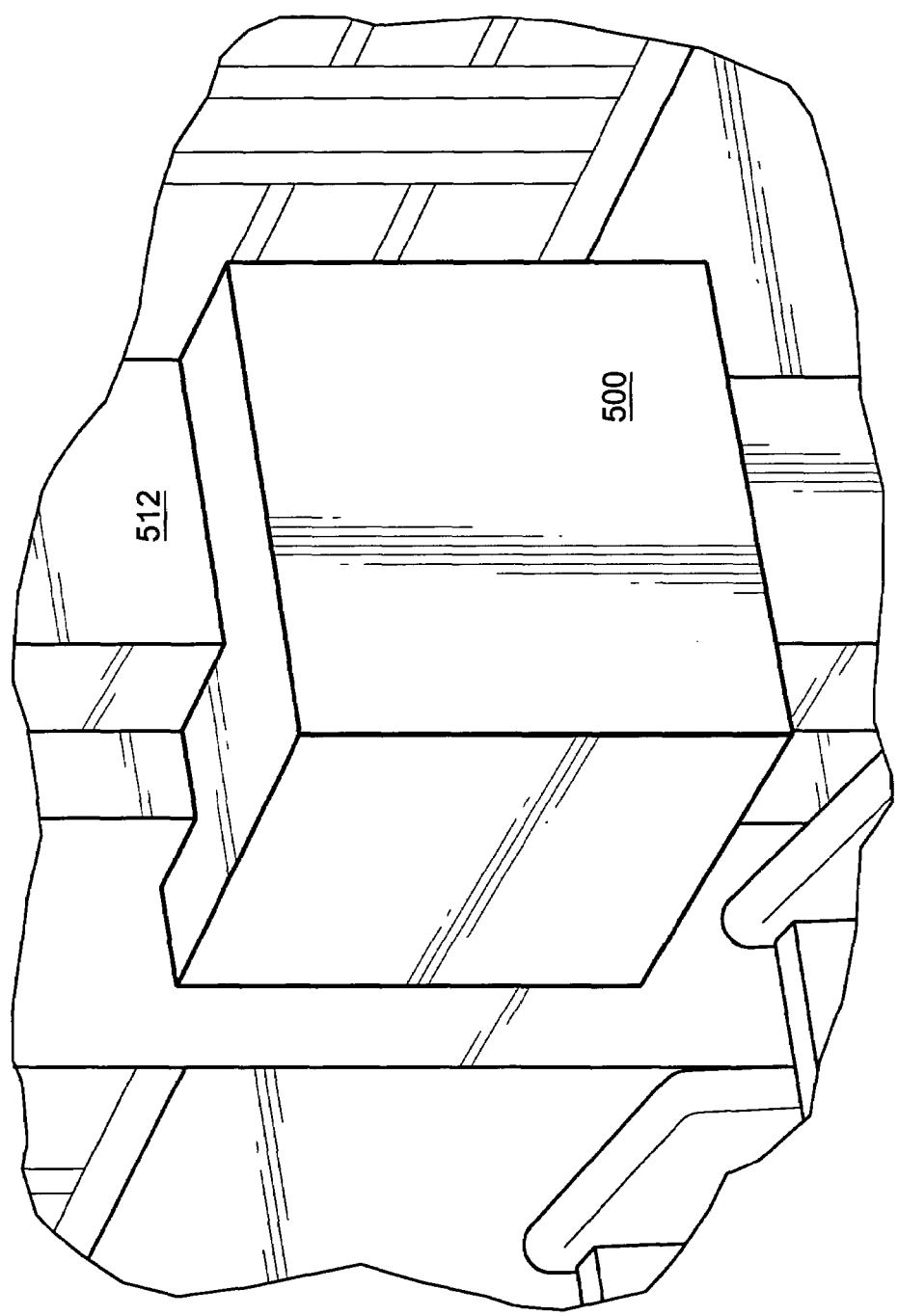

FIGS. 7A-7G show example images that are possible in the cathedral interior scene of FIG. 4A when an exemplary moving object 500 interacts with the cube-mapped scene. The moving object 500 shown in FIGS. 7A-7G is a cube for purposes of illustration only—any animated or non-animated object of any configuration could be used instead. FIG. 7A shows moving object 500 obstructing and being obstructed by different portions of the cube-mapped virtual 3D environment—in this case a railing 502 on the clere story of the virtual cathedral. FIG. 7B shows the same moving object 500 obstructing and being obstructed by a column 504 and also descending and thus being obstructed by portions of the tile floor surface 506 of the virtual cathedral. FIG. 7C shows the same cubic moving object 500 obstructing and being obstructed by ceiling details such as shown in FIG. 5D. FIG. 7D shows the moving object 500 obstructing and being obstructed by an archway detail 508. FIG. 7E shows moving object 500 obstructing and being obstructed by different portions of a pew 510. FIG. 7F shows moving object 500 obstructing and being obstructed by different portions of a column 512 adjacent the cathedral nave. FIG. 7G shows a magnified detail of the FIG. 7F image.

In the exemplary illustrative embodiment, images such as those shown in FIGS. 7A-7G can be created by giving the video game user control over moving object 500 so it can be moved anywhere within the three-dimensional scene defined by the depth-mapped panoramic cube map environment. While the exemplary moving object 500 shown in FIGS. 7A and 7G has the characteristic of being able to pass through virtual solid structure in order to better illustrate hidden surface removal, it is also possible to provide other characteristics such as for example collision detection so the moving object can bounce off or otherwise interact with the depth of the panoramically-rendered scene.

Example Enhancements to Panoramic Compositing
  Example Enhanced Antialiasing:
  The quality of composited renderings could be improved with better antialiasing. This can be achieved by allowing multiple Z values and multiple color values for edge pixels of foreground objects.

We would get a lot of benefit even with just two Z values per pixel. This allows a high quality solution to the halo artifacts which occur when real-time CG characters are positioned between background and foreground pre-rendered elements in 1-depth-sample per pixel compositing.

The following algorithm can be used to render anti-aliased edges in the two depth samples per pixel case.
  1. Render the furthest depth value and RGB value first.
  2. Composite the real-time character as usual.
  3. Alpha-blend on the foreground edges—alpha comes from foreground coverage value.

Note that foreground edges occupy only a small percentage of the pixels, so the antialiasing pass does not need to consume a full frame's worth of fill-rate bandwidth.

Example Panoramic Movie Compositing

It may also be desirable to use movie textures to further enhance the realism, and promote the illusion that the full scene is being rendered in real-time. In many cases, it would be desirable to be able to specify particular regions of the scene to be animated, to help minimize the storage, bandwidth and decompression costs.

If the animations are restricted to lighting only, RGB animation is sufficient. If we want animated foreground objects then animated Z-textures can be used.

While the technology herein has been described in connection with exemplary illustrative non-limiting embodiments, the invention is not to be limited by the disclosure. For example, the pre-rendered environment could be a shape other than a cube. In some cases it would not be necessary to cover the whole panorama. For example if the game did not require the camera to point at the floor or ceiling, a tessellated cylinder could be an efficient shape to use for the pre-rendered environment. Example embodiments can work, for example, with environments composed of multiple planar projected images to achieve a wide degree of camera directional freedom using single planar images. As another example, the technique does not rely on the source material being pre-rendered; the environment could conceivably originate from real world photographs, and associated depth-captured images for example. The invention is intended to be defined by the claims and to cover all corresponding and equivalent arrangements whether or not specifically disclosed herein.

I claim:

1. A video game playing method comprising:
loading a pre-determined environment-cube-mapped image having multiple planar projected images and associated depth maps;
receiving real-time interactive inputs from a user;
at least in part in response to said real-time interactive user inputs, compositing at least one additional three-dimensional object, having plural non-coplanar surfaces, into a scene comprising said environment-cube-mapped images;
in response to said received user input, moving said three-dimensional object having said plural non-coplanar surfaces within said environment-cube-mapped images, said compositing using said depth maps to selectively render at least portions of said three-dimensional object to provide a composite image;
said compositing performing depth comparisons between depth values associated with said plural non-coplanar surfaces of said three-dimensional object and said depth maps associated with said environment-cube-mapped multiple planar projected images so as to selectively allow said three-dimensional object surfaces to be partially occluded by portions of said environment-cube-mapped images as said user inputs cause said three-dimensional object to move and to thereby interact with said environment-cube-mapped images; and
using a three-dimensional graphics engine to panoramically render said composite image using a desired viewing angle to provide interactive 3D video game play.

2. The method of claim 1 wherein said environment-cube-mapped image is pre-rendered.

3. The method of claim 1 including performing said compositing with a home video game system, and further including displaying rendering results on a home color television set.

4. The method of claim 1 wherein said receiving comprises receiving interactive real-time user inputs via at least one handheld controller, and said method further includes defining animation of said three-dimensional object at least in part in response to said inputs.

5. The method of claim 1 wherein said rendering comprises applying said composite image to a mesh, and rendering said mesh using a projection matrix to apply desired viewing angle and frustum parameters.

6. The method of claim 1 further including testing whether said three-dimensional object intersects any of multiple faces of said environment-cube-mapped image in at least two dimensions.

7. The method of claim 1 further including performing Z comparison and removing hidden surfaces in response to said Z comparison.

8. The method of claim 1 further including performing said rendering using a frame buffer.

9. The method of claim 1 further including detecting collisions between the three-dimensional object surfaces and the environment cube mapped images.

10. A computer readable storage medium storing instructions that, when executed by a home video game system or personal computer, provide interactive real-time video game play on a display at least in part in response to user input, said storage medium storing:
at least one pre-rendered cubic environment map;
at least one pre-rendered depth map corresponding to said cubic environment map;
instructions that, when executed, composite at least portions of said pre-rendered cubic environment map with at least one dynamically-generated three-dimensional object having plural non-coplanar surfaces, said compositing based at least in part on said pre-rendered depth map;
instructions that, in response to received user inputs, interactively move said three-dimensional object within said cubic environment map;
said compositing performing depth comparisons between said plural non-coplanar surfaces of said three-dimensional object and said cubic environment map so as to selectively allow said three-dimensional object surfaces to be partially occluded by portions of said cubic environment map as said user input causes said three-dimensional object to move within and interact with said cubic environment map; and
instructions that control a three-dimensional graphics engine to generate a rendered panoramic image based at least in part on said depth comparisons.

11. The storage medium of claim 10 wherein said pre-rendered cubic environment map comprises six images as if looking through faces of a cube with the viewpoint at the center of the cube.

12. The storage medium of claim 10 wherein said compositing includes rendering a real-time object into a frame buffer storing said pre-rendered cubic environment map using dynamically defined view port and/or frustum parameters.

13. The storage medium of claim 10 further storing instructions that detect a collision between the three-dimensional object and the cubic environment map.

14. A video game playing system comprising:
means for loading a pre-determined environment-cube-mapped image having multiple planar projected images and associated multiple depth maps;
means for, at least in part in response to real-time interactive user input, compositing into said mapped images at least one additional three dimensional object having plural non-coplanar surfaces; said compositing means using said depth maps to selectively render at least portions of said three-dimensional object within the cube mapped image to provide a composited mapped image;
means for receiving interactive inputs from a user;
means for moving said three-dimensional object within said mapped image at least in part in response to said received user inputs,
said compositing means dynamically performing depth comparisons between said plural non-coplanar surfaces of said three-dimensional object and said mapped image so as to selectively allow said three-dimensional object surfaces to be partially hidden by portions of said mapped image as said user input moves said three-dimensional object within said mapped image; and means for using a three-dimensional graphics engine to panoramically render said composited mapped image using a desired viewing angle to provide interactive 3D video game play.

15. The system of claim 14 wherein said pre-determined environment cube mapped image is created at authoring time.

16. The system of claim 14 wherein said pre-determined environment cube mapped image is created before game play.

17. The system of claim 14 wherein said compositing means includes means for compositing said composited mapped image in pieces less than the full size of a cube face.

18. The system of claim 14 wherein said compositing means includes means for representing said depth maps using Z textures.

19. The system of claim 14 wherein said compositing means composites and outputs only those cube face images which overlap both the final frustum and real-time objects to be imaged.

20. The system of claim 14 further including means for using at least one movie texture to provide said environment cube mapped image, and means for specifying portions of said environment map to be animated.

21. The system of claim 14 further including means for detecting a collision between the three-dimensional object surfaces and the cube mapped image.

22. A video game playing system comprising:

means for loading a pre-determined environment-mapped image having multiple planar projected images and associated multiple depth map images;

means for at least in part in response to real-time interactive user input, compositing at least one additional object into said mapped images, said compositing using said depth map to selectively render at least portions of said object into the cube mapped image to provide a composited mapped image; and means for panoramically rendering said composited mapped image using a desired viewing angle and frustum to provide interactive video game play, wherein said multiple depth map images are biased towards using background Z value as the representative Z value for pixels whose RGB is a mixture of foreground and background colors.

\* \* \* \* \*